(No Model.)

L. BRIGHAM.
SOFT GROUND HORSESHOE.

No. 345,763. Patented July 20, 1886.

Witnesses.
John C. Perkins
Leonard C. Church

Inventor.
Lyceum Brigham
By Lucius C. West
Atty.

UNITED STATES PATENT OFFICE.

LYSCOM BRIGHAM, OF ORANGEVILLE MILLS, MICHIGAN.

SOFT-GROUND HORSESHOE.

SPECIFICATION forming part of Letters Patent No. 345,763, dated July 20, 1886.

Application filed November 3, 1885. Serial No. 181,743. (No model.)

*To all whom it may concern:*

Be it known that I, LYSCOM BRIGHAM, a citizen of the United States, residing at Orangeville Mills, county of Barry, State of Michigan, have invented a new and useful Soft-Ground Horseshoe, of which the following is a specification.

This invention has for its object certain improvements hereinafter described and claimed.

Figure 1:
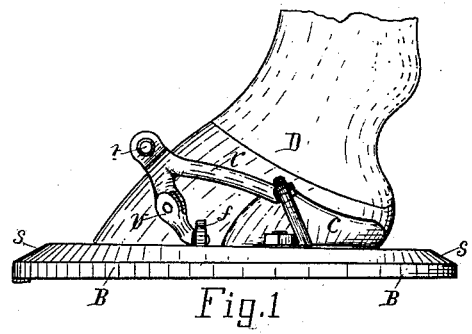
Figure 2:
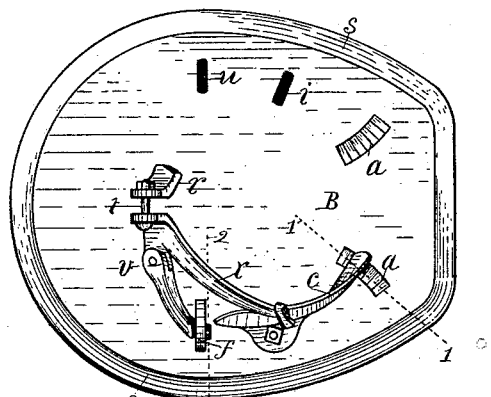
Figure 3:
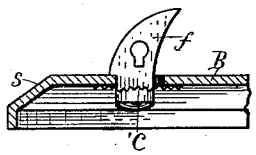
Figure 4:
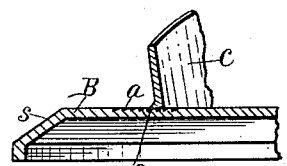

In the drawings forming a part of this specification, Figure 1 is a side elevation; Fig. 2, a top view with parts removed; Fig. 3, a section on line 2 2 in Fig. 2, and Fig. 4 is a section on line 1 1 in Fig. 2.

Referring to the letters marked on the drawings, B is the shoe, made much larger than the horse's foot, as heretofore, and formed with a beveled edge, s, to lighten the weight of the shoe, and also to prevent catching mud and dirt to that degree which would be the case if the shoe were not beveled at the edge.

In shoes heretofore invented by me I have used the bail r, detachably connecting with the shoe B and clamped over the hoof by bolt t; but in the present instance I make a joint in the front branch of the bail to facilitate the adjustment of the bail to the hoof and also its connection with the coupling f. This coupling f is provided with head c', having a ratchet-surface engaging a ratchet-surface on the under side of the shoe, as heretofore; but in the present case it is inserted up through an elongated slot in the shoe, and it is made concave on the side which engages the hoof and convex on the other side. By this means the upper part of the coupler will tilt over against the hoof in conformity with the varying sizes, and the convexity on the other side prevents danger of one shoe catching on the coupling of another shoe in case the horse should interfere or step one foot on the shoe of the other.

The guard-coupling c at the rear sides of the hoof have heretofore been employed by me in the construction of this class of shoes; but I find the rear end should have an adjustable and a fixed position—that is, fixed stationary at whatever point it is adjusted to—in accordance with the size of the horse's hoof. To this end I provide the part c with lugs e, and provide the shoe with serrations a in the upper surface of the shoe. Thus the coupling c may be adjusted to any desired position by swinging it on its securing-bolt, Figs. 1 and 2. This prevents the guard-plate from working loose by the hoof pressing against it and swinging it out of place. Besides, some feet are smaller than others and of different shape, and by this means the plate can be brought against the hoof at the proper angle, and secured there by inserting the lug e in one of the serrations before screwing down the bolt which holds the guard-plate. One branch of the bail couples with the plate c.

The prior constructions of mine above referred to were patented to me September 25, 1883, Nos. 285,562 and 285,563.

Having thus described my invention, what I claim as new is—

1. The combination, with the shoe having the serrations in its upper face at the rear corners, of the securing-bail and the guard-plates having the lugs to engage with the serrations, substantially as set forth.

2. The combination of the shoe and bail with the side lugs inserted in elongated slots, so as to be tilted toward the hoop, and concaved on the inside and convexed on the outside, substantially as set forth.

3. The combination of the shoe, the branched bail having the forward branch jointed, and means coupling the bail with the shoe, substantially as set forth.

In testimony of the foregoing I have hereunto subscribed my name in presence of two witnesses.

LYSCOM BRIGHAM.

Witnesses:
 T. G. ADAMS,
 E. C. SOUTHARD.